(12) United States Patent
Sheard et al.

(10) Patent No.: US 10,415,977 B2
(45) Date of Patent: Sep. 17, 2019

(54) MULTIPLE SENSOR INTEGRATION

(71) Applicant: Atlantic Inertial Systems Limited, Plymouth, Devon (GB)

(72) Inventors: John Keith Sheard, Plymouth Devon (GB); Nicholas Mark Faulkner, Plymouth Devon (GB)

(73) Assignee: ATLANTIC INERTIAL SYSTEMS LIMITED, Plymouth, Devon (GB)

( * ) Notice: Subject to any disclaimer, the term of this patent is extended or adjusted under 35 U.S.C. 154(b) by 98 days.

(21) Appl. No.: 15/545,822

(22) PCT Filed: Jan. 26, 2016

(86) PCT No.: PCT/GB2016/050156
§ 371 (c)(1),
(2) Date: Jul. 24, 2017

(87) PCT Pub. No.: WO2016/120600
PCT Pub. Date: Aug. 4, 2016

(65) Prior Publication Data
US 2018/0017389 A1 Jan. 18, 2018

(30) Foreign Application Priority Data
Jan. 26, 2015 (GB) .................................. 1501206.5

(51) Int. Cl.
*G01C 21/16* (2006.01)
*G01C 25/00* (2006.01)
*G01C 23/00* (2006.01)

(52) U.S. Cl.
CPC ........... *G01C 21/16* (2013.01); *G01C 25/005* (2013.01); *G01C 23/00* (2013.01)

(58) Field of Classification Search
CPC ....... G01C 21/16; G01C 25/005; G01C 23/00
See application file for complete search history.

(56) References Cited

U.S. PATENT DOCUMENTS

| 4,095,271 A * | 6/1978 | Muller ................... G01C 9/005 244/181 |
| 2010/0063763 A1* | 3/2010 | Rozelle .............. G01C 19/5691 702/92 |

FOREIGN PATENT DOCUMENTS

| EP | 2172743 A2 | 4/2010 |
| WO | 2007050163 A1 | 5/2007 |

OTHER PUBLICATIONS

European Search Report for Application No. PCT/GB2016/050156 dated Apr. 7, 2016, 2 pages.

* cited by examiner

Primary Examiner — Xin Y Zhong
(74) Attorney, Agent, or Firm — Cantor Colburn LLP

(57) ABSTRACT

A method of compensating for signal error is described, comprising: receiving a first signal from a first sensor, said first signal indicative of a movement characteristic; applying an error compensation to said first signal to produce an output signal; applying a variable gain factor to said error compensation; receiving a second signal from a second sensor indicative of said movement characteristic; wherein said error compensation is calculated using the difference between said output signal and said second signal, and said variable gain factor is calculated using said first signal.

14 Claims, 1 Drawing Sheet

MULTIPLE SENSOR INTEGRATION

CROSS REFERENCE TO RELATED APPLICATIONS

This is a US National Stage of Application No. PCT/GB2016/050156 filed on Jan. 26, 2016, which claims the benefit of GB Application No. 1501206.5 filed Jan. 26, 2015, the disclosures of which are incorporated herein by reference.

BACKGROUND

This disclosure relates to the combination of data from multiple sources, for example sensors.

Conventional techniques for this comprise well-known filters, such as a complementary filter. These have been used in Inertial Measurement Units ("IMU") to combine, for example, accelerometer and gyroscope data. Such filters only use a single estimate as a baulked error, and do not generally comprise, for example, a feedback loop.

More complex systems are known, for example a Kalman filter, which involve estimating state variables as well as their uncertainty, and continuously updating these using a weighted average. These methods typically involve feedback loops as well as complex matrix calculations.

It is desired to provide improved methods of combining data from multiple sensors and to reduce measurement error.

SUMMARY

According to the disclosure, there is provided a method of compensating for signal error, comprising:

receiving a first signal from a first sensor, the first signal indicative of a movement characteristic;

applying an error compensation to the first signal to produce an output signal;

applying a variable gain factor to the error compensation;

receiving a second signal from a second sensor indicative of the movement characteristic;

wherein the error compensation is calculated using the difference between the output signal and the second signal, and the variable gain factor is calculated using the first signal.

The first signal and the second signal may each be from a gyroscope or accelerometer. The movement characteristic may be angular rate.

The first sensor may be a different type of sensor, and/or have different characteristics than the second sensor.

The first sensor may exhibit a lower high frequency noise than the second sensor.

The second sensor may exhibit better bias and/or scale factor and/or long-term stability.

The gain factor may be varied as a function of one or more operating conditions corresponding to the movement characteristic. The gain factor may be varied as a function of the first signal. The value of the gain factor may be positively or negatively correlated with the value of the first signal or the movement characteristic.

The one or more operating conditions may be predetermined. The one or more operating conditions may each comprise a given value of the movement characteristic. For exmaple, a first operating condition may be a lower angular rate, and a second operating condition may be a higher angular rate. Many other predetermined operating conditions are envisaged and the disclosure is not limited to angular rate, or high and low values of a movement characteristic. As discussed below, for example, various values of the first derivative of the movement characteristic could be used as predetermined operating conditions. Therefore the one or more operating conditions may each comprise a given value of a first derivative of the movement characteristic.

The gain factor may be varied between 0-1.

The error compensation may comprise a plurality of error compensations.

The method may further comprise applying different gain factors to each of the error compensations. A first of the plurality of error compensations may be related to bias, and a second of the plurality of error compensations may be related to scale factor.

The method may further comprise decreasing a gain factor applied to a first of the plurality of error compensations as the magnitude of the movement characteristic increases, and increasing a gain factor applied to a second of the plurality of error compensation as the magnitude of the movement characteristic increases.

In other words, as the operating condition changes, e.g. the magnitude of the movement characteristic increases or decreases, the gain factor may be increased or decreased. It will be appreciated that where different gain factors are applied, the different gain factors may vary differently in response to the change in the first signal, movement characteristic or operating condition.

Appropriate selection of parameters, for example gain, allows different error components to be configured for any particular operating condition, due to their different influence on the output signal under different operating conditions.

For example, a first error compensation, e.g. corresponding to a scale factor error, may have a greater influence at a first operating condition, for example higher angular rates, than at a second operating condition, for example lower angular rates. In contrast, a second error compensation, e.g. corresponding to a bias error, may have may have a lesser influence at the first operating condition than at the second operating condition.

In this situation, a first gain factor applied to the first error compensation may be greater at said first operating condition than at said second operating condition, and a second gain factor applied to the second error compensation may be lesser at said first operating condition than at said second operating condition.

It will be appreciated that the output signal represents an improved measurement of the movement characteristic. Thus, the disclosure extends to a method of measuring a movement characteristic, for example angular rate, comprising the methods of compensating for signal error described above, and may include the step of providing a value for the movement characteristic using the output signal. The method may comprise outputting the value of the movement characteristic, for example displaying the value on a monitor or outputting the value in a data stream.

According to an aspect of the disclosure, there is disclosed a method of operating an Inertial Measurement Unit ("IMU") comprising any of the methods of compensating for signal error, or measuring a movement characteristic, described above. The method may comprise outputting the value of the movement characteristic in a data stream output from the IMU.

The disclosure extends to systems arranged to carry out the methods described above, for example an electronic control system as part of, for example, a platform guidance system.

The disclosure also provides an apparatus for compensating for signal error, the apparatus comprising means adapted to carry out the methods described above.

All or part of the apparatus may form part of an Inertial Measurement Unit ("IMU") and may be, for example, a data processing means within the IMU. In some embodiments, all or part of the apparatus is remote from, but is communicably coupled with, the IMU and is, for example, a computer system (e.g. a server) comprising data processing means.

The methods according to the present disclosure may be implemented at least partially using computer programs or software code portions.

Thus, according to an aspect of the disclosure there is provided a computer program comprising code for performing the methods described above when run on data processing means.

According to another aspect of the disclosure there is provided a computer readable medium storing software code portions for performing the methods described above when run on a data processing means.

The computer readable medium may comprise a non-transitory medium, such as a CD or other optical disk, a diskette, or a hard disk, or may comprise a transitory medium such as an electronic or optical signal transmittable to a computer system, via a modem or other interface device, over either a tangible medium, including but not limited to optical or analogue communications lines, or intangibly using wireless techniques, including but not limited to microwave, infrared or other transmission techniques.

In accordance with the disclosure, there is provided a system for compensating for signal error, comprising:

a first sensor configured to receive a first signal indicative of a movement characteristic;

a second sensor configured to receive a second signal indicative of the movement characteristic;

one or more devices configured to apply an error compensation to the first signal to produce an output signal, and to apply a variable gain factor to the error compensation;

wherein the one or more devices calculate the error compensation using the difference between the output signal and the second signal, and calculate the gain factor using the first signal.

The disclosure also extends to an IMU comprising an electronic control system, wherein the electronic control system comprises the above described system for compensating for signal error. The system may form part of, for example, a platform guidance system, for example comprising the IMU.

BRIEF DESCRIPTION OF THE DRAWINGS

Various embodiments will now be described, by way of example only, and with reference to the accompanying drawings in which.

DETAILED DESCRIPTION

Figure 1:
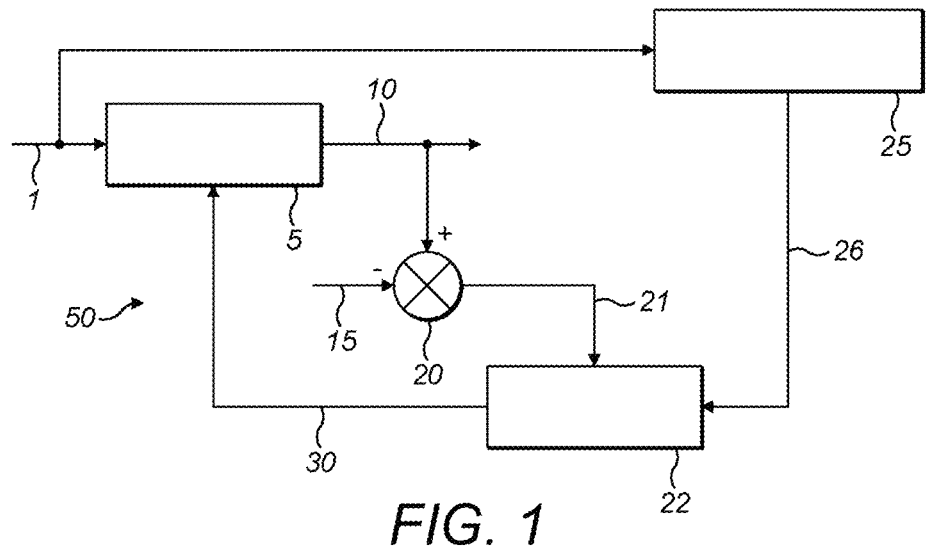
FIG. 1 shows a first embodiment.

FIG. 1 shows a first embodiment of a system 50 for compensating for signal error. The system can be used in a number of applications, for example in the processing or control system of an Inertial Measurement Unit ("IMU") and sensors thereof. One example is the combination of data from multiple sensors of the same type, e.g. two gyroscopes and/or two accelerometers, for example in a platform guidance system where the sensors may be used for stabilisation of the platform.

In accordance with the first embodiment, a first signal 1 is received from a first sensor (not shown). The first signal 1 is indicative of a movement characteristic, such as angular rate, angular acceleration, linear rate or linear acceleration. A device 5 applies an error compensation to the first signal 1 to produce an output signal 10. The output signal 10 may then be transmitted onwards. The output signal 10 is also transmitted to a device 20 for measuring the difference between two signals.

A second signal 15 is received from a second sensor (not shown). The second signal 15 is also indicative of said movement characteristic. That is, the first sensor and the second sensor measure the same movement characteristic, for example angular rate. The first sensor and the second sensor may be different types of sensors, or may have different characteristics. The output signal 10 may therefore be based on the better performance parameters of the different sensors using knowledge of their different error characteristics combined with a measure of the instantaneous movement characteristic.

For example, the first sensor may be selected as the "reference" sensor, for example due to having a lower high frequency noise than the second sensor. However, this type of sensor typically has a worse performance over long time periods, so the second sensor may be chosen that has a better performance over long time periods.

The second signal 15 is received by the device 20, which outputs a signal 21 indicative of the difference between the output signal 10 and the second signal 15. The signal 21 from the device 20 is then transmitted to a device 22 for calculating an estimate of the error of the output signal 10.

The first signal 1 is also transmitted to a device 25 for calculating a gain factor. The gain factor may be varied, for example in order to tune the response of the system, that is the output signal 10, for different operating conditions. The gain factor may be related to the first signal, for example the gain factor may be positively or negatively correlated with the first signal 1. The gain factor may be correlated with the magnitude of the first signal, such as a magnitude value of angular rate. The operating conditions may be related to the movement characteristic, or a derivative of the movement characteristic, for example angular rate or angular acceleration.

In this manner, as the operating condition of the system changes, for example an increase in angular rate, the gain factor may be increased or decreased in response to this. This may reflect that the error from the first sensor may be likely to increase as the magnitude of the movement characteristic increases.

The gain factor output from the device 25 may be in the range from 0 to 1. The gain factor may be set to zero for certain operating conditions, for example if the movement characteristic is above or below a predefined value. As discussed above, the gain factor may then be varied from 0 to 1 based on a predefined correlation with the operating conditions, for example a positive or negative correlation with the first signal 1, which is indicative of the movement characteristic.

The gain factor may then be sent in a signal 26 output from the device 25, which is received by the device 22. It will be appreciated that the gain factor could be calculated by the device 22. The device 22 applies the gain factor to the signal 21, which is indicative of the difference between said output signal and said second signal, and outputs an error signal 30 indicative of an estimate of the error of the output signal 10. The device 22 may apply a calculation in the form:

error value=(output signal−second signal)×gain factor    [1]

After an instantaneous, or current error value is calculated it may be accumulated or integrated with previous error values to give a total error estimate. The error estimate, which may be an instantaneous error estimate or a total error estimate, is then sent to the device 5 for applying the error compensation to the first signal.

Figure 2:
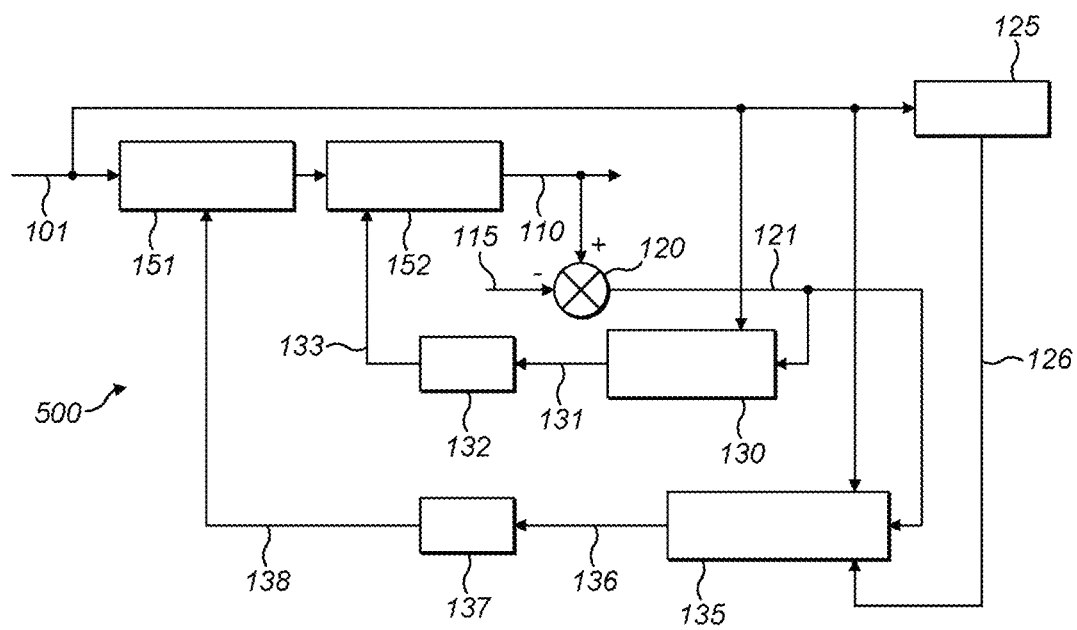
FIG. 2 shows a second embodiment.

FIG. 2 shows a second embodiment of a system 500 for compensating for signal error.

A first signal 101 is received from a first sensor (not shown). The first signal 101 is indicative of a movement characteristic, such as angular rate, angular acceleration, linear rate or linear acceleration. A number of devices 151, 152 apply an error compensation to the first signal 101 to produce an output signal 110. The error compensation comprises a bias compensation and a scale factor compensation. The bias compensation is applied by device 151, and the scale factor compensation is applied by device 152.

The output signal 110 may then be transmitted onwards. The output signal 10 is also transmitted to a device 120 for measuring the difference between two signals.

A second signal 115 is received from a second sensor (not shown). The second signal 115 is also indicative of said movement characteristic. That is, the first sensor and the second sensor measure the same movement characteristic, for example angular rate. The first sensor and the second sensor may be different types of sensors, or may have different characteristics. The output signal 110 may therefore be based on the better performance parameters of the different sensors.

For example, the first sensor may be selected as the "reference" sensor, for example due to having a lower high frequency noise than the second sensor. However, this type of sensor typically has a worse performance over long time periods, so the second sensor may be chosen that has a better performance over long time periods.

The second signal 115 is received by the device 120, which outputs a signal 121 indicative of the difference between the output signal 110 and the second signal 115. The signal 121 from the device 120 is then transmitted to a number of devices 130, 135 for calculating an estimate of the error of the output signal 110.

In this embodiment, the errors are characterised as a bias error and a scale factor error. At different operating conditions, the different errors will have different influences on the output signal 110. Appropriate selection of parameters, for example gain, allows the different error components to be configured for any particular operating condition, due to their different influence on the output signal 110 under different operating conditions. For example, in this embodiment the scale factor error has maximum influence at high rotation rates, and the bias error having maximum influence at low rotation rates. As such, these are compensated individually as described in more detail below.

The device 151 applies a scale factor compensation using a calculation in the form:

scale factor output=first signal×(1−scale factor error)    [2]

The device 152 applies a bias compensation using a calculation in the form:

output signal=scale factor output−bias error    [3]

Thus, the overall calculation of the output signal 110 is in the form:

output signal=[first signal×(1−scale factor error)]−bias error    [4]

For the bias compensation, the signal 121, which is indicative of the difference between the output signal 110 and the second signal 115, is transmitted to a device 130 for calculating a bias error.

The device 130 also receives the first signal 101 and calculates a bias gain factor using the first signal 101. The bias gain factor may, therefore, be representative of the magnitude of the movement characteristic, for example the magnitude of angular rate.

The bias gain factor may be in the range from 0 to 1. The bias gain factor may be set to zero for certain operating conditions, for example if the movement characteristic is below a predefined value, such as below a given magnitude of angular rate. The bias gain factor may then be varied from 0 to 1 based on a predefined negative correlation with the first signal 101, which is indicative of the movement characteristic. That is, as the magnitude of the movement characteristic increases, the bias gain factor decreases.

The device 130 applies the bias gain factor to the signal 121, which is indicative of the difference between said output signal and said second signal, and outputs a signal 131 indicative of an estimate of the instantaneous bias error of the output signal 110. The device 130 may apply a calculation in the form:

bias error signal=(output signal−second signal)×bias gain factor    [5]

The bias error signal 131 may be received by device 132 for accumulating or integrating the instantaneous bias error with preceding error values and outputting a signal 133 indicative of the total bias error. The bias error referred to above and in calculations [3] and [4] may be the instantaneous bias error or the total bias error.

For the scale factor compensation, the signal 121, which is indicative of the difference between the output signal 110 and the second signal 115, is transmitted to a device 135 for calculating a scale factor error.

A device 125 may be provided for calculating a first derivative of the movement characteristic. The device 125 may receive the first signal 101, which is indicative of the movement characteristic, and output a signal 126 indicative of the first derivative of the movement characteristic. In the case of the movement characteristic being angular rate, the first derivative is angular acceleration.

The device 135 receives the first signal 101 and signal 126, which is indicative of the first derivative of the movement characteristic, and calculates a scale factor gain factor using the first signal 101 and signal 126. The scale factor gain factor may, therefore, be representative of the magnitude of the movement characteristic, for example the magnitude of angular rate, and the magnitude of the first derivative of the movement characteristic, for example angular acceleration.

The scale factor gain factor may be in the range from 0 to 1. The scale factor gain factor may be set to zero for certain operating conditions, for example if the movement characteristic, and/or its first derivative are above or below predefined values, such as below a given magnitude of angular rate or angular acceleration.

The scale factor gain factor may then be varied from 0 to 1 based on a predefined positive correlation with the movement characteristic and the first derivative of the movement characteristic. That is, as the magnitude of the movement characteristic increases, and the magnitude of the first derivative of the movement characteristic increases, the scale factor gain factor increases.

The device 135 applies the scale factor gain factor to the signal 121, which is indicative of the difference between said output signal and said second signal, and outputs a signal 136 indicative of an estimate of the instantaneous scale factor error of the output signal 110. The device 135 may apply a calculation in the form:

scale factor error signal=(output signal−second signal)×scale factor gain factor  [6]

The scale factor error signal 136 may be received by device 137 for accumulating or integrating the instantaneous scale factor error with preceding error values and outputting a signal 138 indicative of the total scale factor error. The scale factor error referred to above and in calculations [2] and [4] may be the instantaneous bias error or the total bias error.

The scale factor error and bias error values are then transmitted to the respective devices 151, 152 for calculation of the scale factor compensation and bias compensation as discussed above.

The gain factor(s) in the present disclosure, for example the scale factor gain factor and bias gain factor, may be chosen or calculated according to the characteristics of each sensor and the dynamic operating range of the system.

For example, the scale factor gain factor may be calculated to have a value at a maximum angular rate such that the time constant is less than 1 second. The scale factor gain factor may be set to zero for angular rates below 2 degrees/second. The bias gain factor may be set to provide a time constant of about 5 seconds at low angular rates, and may reduce as the angular rate increases to increase the time constant by a factor of four at the maximum angular rate.

Although the above embodiments have been described with reference to drawings, it will be understood by those skilled in the art that various changes in form and detail may be made without departing from the scope of the disclosure as set forth in the accompanying claims. For example, the term "device" used herein may be referred to as a component, a process, for example an electronic process, as will be appreciated by a person skilled in the art.

The invention claimed is:

1. A method of compensating for sensor signal error, comprising:
  receiving a first signal from a first sensor, said first signal indicative of a movement characteristic;
  applying an error compensation to said first signal to produce an output signal;
  applying a variable gain factor to said error compensation;
  receiving a second signal from a second sensor indicative of said movement characteristic;
  wherein said error compensation is calculated using the difference between said output signal and said second signal, and said variable gain factor is calculated using said first signal;
  wherein said error compensation comprises a plurality of error compensations;
  wherein the method further comprises:
  applying different gain factors to each of said error compensations; and
  decreasing a gain factor applied to a first of said plurality of error compensations as the magnitude of said movement characteristic increases, and increasing a gain factor applied to a second of said plurality of error compensation as the magnitude of said movement characteristic increases.

2. The method as claimed in claim 1, wherein said first signal and said second signal are each from a gyroscope or accelerometer, and said movement characteristic is angular rate.

3. The method as claimed in claim 1, wherein said first sensor is a different type of sensor, or has different characteristics than said second sensor.

4. The method as claimed in claim 1, wherein said first sensor exhibits a lower high frequency noise than said second sensor.

5. The method as claimed in claim 1, wherein said second sensor exhibits better bias, scale factor or long-term stability.

6. The method as claimed in claim 1, wherein said gain factor is varied as a function of one or more operating conditions corresponding to said movement characteristic.

7. The method as claimed in claim 6, wherein said one or more operating conditions are predetermined.

8. The method as claimed in claim 6, wherein said one or more operating conditions each comprise a given value of said movement characteristic.

9. The method as claimed in claim 6, wherein said one or more operating conditions each comprise a given value of a first derivative of said movement characteristic.

10. The method as claimed in claim 1, wherein said gain factor is varied between 0 and 1.

11. The method as claimed in claim 1, wherein a first of said plurality of error compensations is related to bias, and a second of said plurality of error compensations is related to scale factor.

12. The method of claim 1, further comprising:
  stabilizing a platform based on the output signal.

13. A system for compensating for sensor signal error, comprising:
  a first sensor configured to receive a first signal indicative of a movement characteristic;
  a second sensor configured to receive a second signal indicative of said movement characteristic;
  one or more devices configured to apply an error compensation to said first signal to produce an output signal, and to apply a variable gain factor to said error compensation;
  wherein said one or more devices calculate said error compensation using the difference between said output signal and said second signal, and calculate said gain factor using said first signal;
  wherein said error compensation comprises a plurality of error compensations;
  wherein the one or more devices are further configured to:
  apply different gain factors to each of said error compensations; and
  decrease a gain factor applied to a first of said plurality of error compensations as the magnitude of said movement characteristic increases, and increase a gain factor applied to a second of said plurality of error compensation as the magnitude of said movement characteristic increases.

14. The system of claim 13, wherein the one or more devices are computing devices configured to provide the output signal to stabilize a platform.

* * * * *